P. McDERMOTT.
WATERMOBILE.
APPLICATION FILED JAN. 16, 1908.
904,713.
Patented Nov. 24, 1908.
2 SHEETS—SHEET 1.
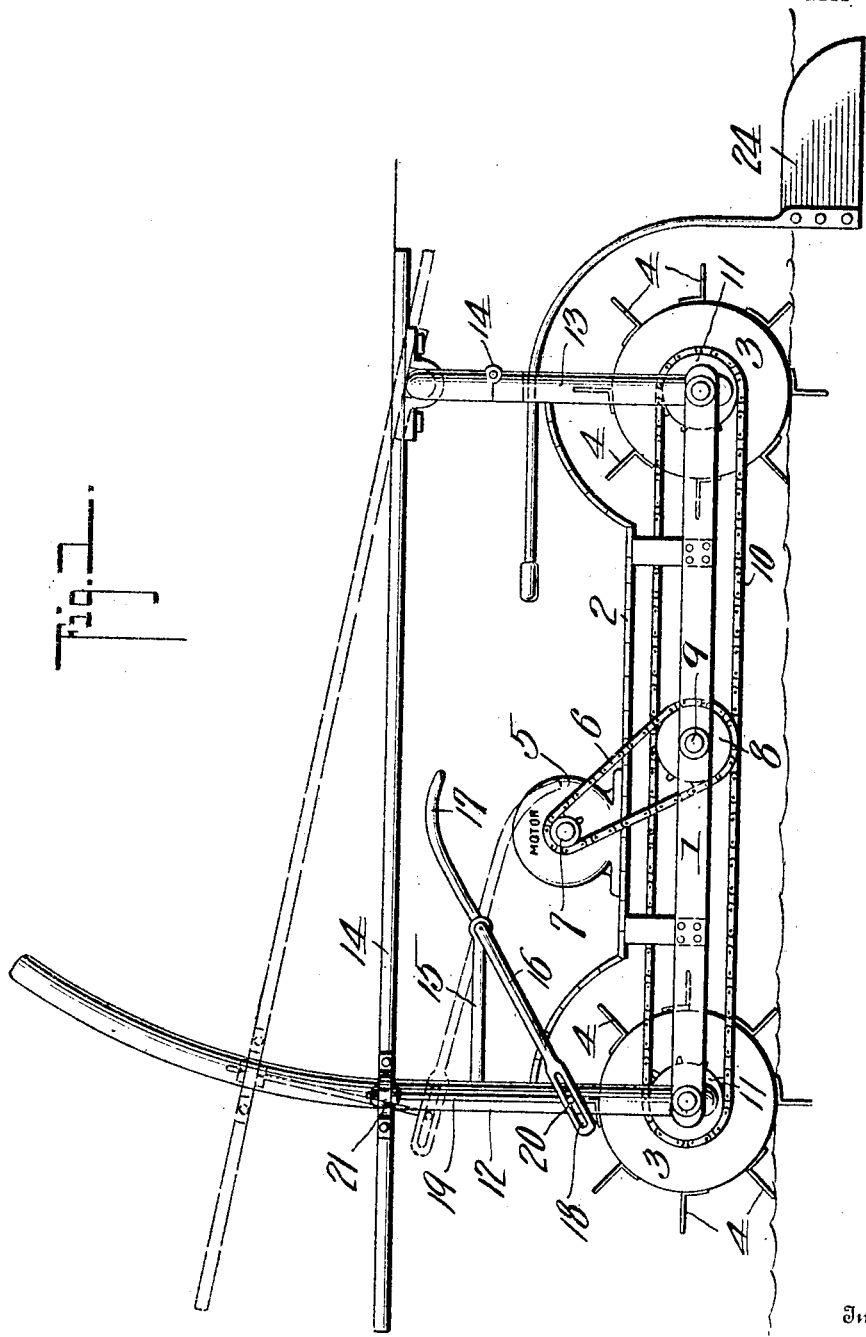
Witnesses
Inventor
Phill McDermott

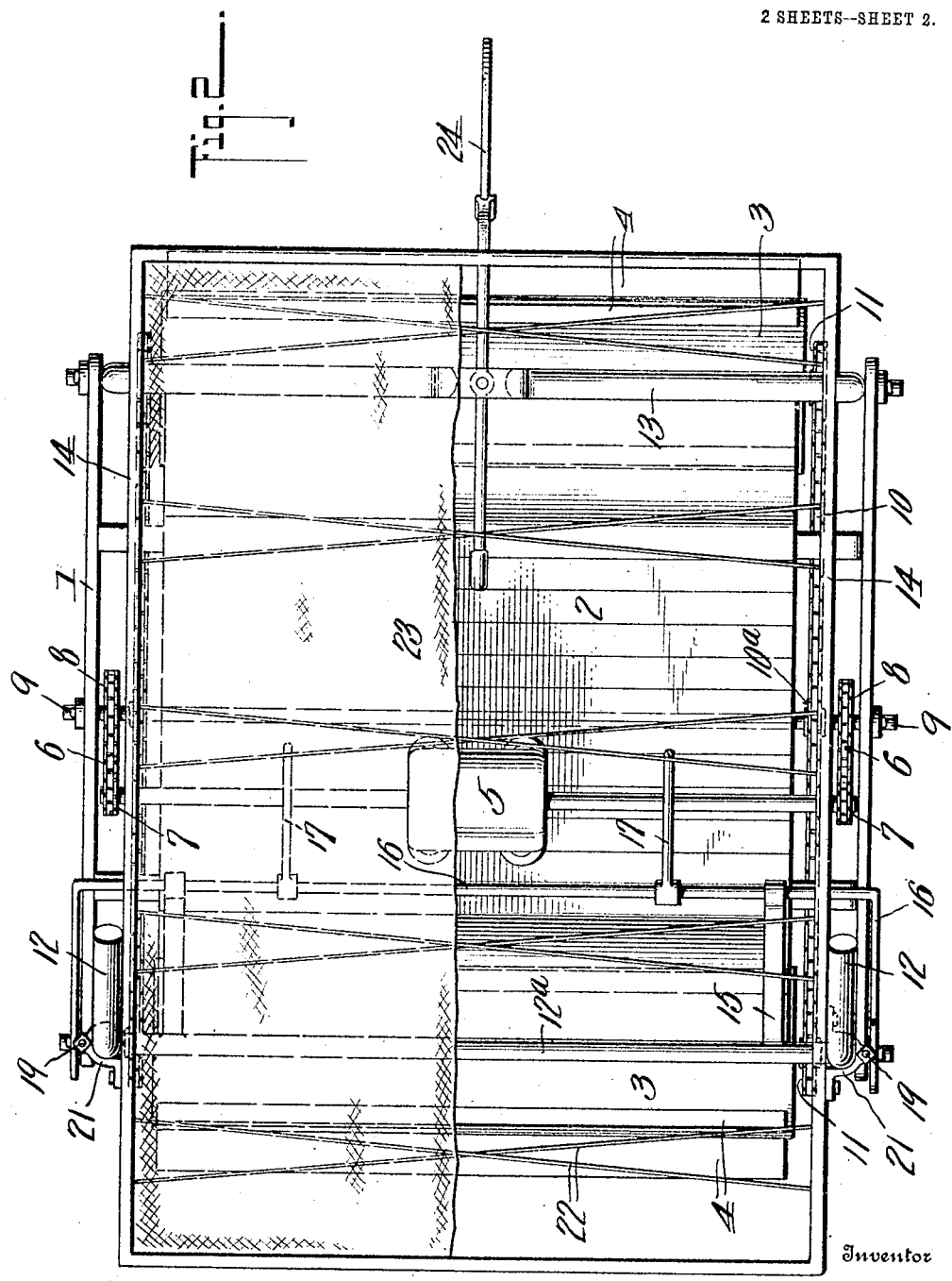

UNITED STATES PATENT OFFICE.

PHILL McDERMOTT, OF DERMOTT, ARKANSAS, ASSIGNOR OF ONE-HALF TO R. A. BUCKNER, OF DERMOTT, ARKANSAS.

WATERMOBILE.

No. 904,713.   Specification of Letters Patent.   Patented Nov. 24, 1908.

Application filed January 16, 1908. Serial No. 411,154.

*To all whom it may concern:*

Be it known that I, PHILL McDERMOTT, a citizen of the United States, residing at Dermott, in the county of Chicot and State of Arkansas, have invented a new and useful Improvement in a Watermobile, of which the following is a specification.

This invention is a watermobile, and the object of the invention is a water craft which will travel upon the surface of the water, being propelled by suitable paddles but which will have practically no draft beyond the depth of the paddles being provided with an aerial plane which will prevent the device sinking into the water thereby relieving it of the resistance of the water which must be overcome by a vessel which is partially submerged.

The invention consists of the novel features of construction hereinafter described, pointed out in the claims, and shown in the accompanying drawings in which:—

Figure 1 is a side elevation. Fig. 2 is a plan view.

In constructing a device of this kind I employ a frame 1 above which is arranged a suitable platform 2, and at each end of the frame I arrange rotatable hollow air-tight cylinders 3 designed to rest upon the surface of the water and provided with paddles 4. A motor 5 is placed upon the platform and a sprocket chain 6 runs over a sprocket wheel 7 on the motor shaft and also over a sprocket wheel 8 on a power shaft 9 which shaft is journaled transversely in the frame 1 midway its ends. A sprocket chain 10 runs the length of the frame on each side and over sprocket wheels 11 carried by the ends of the cylinders 3 said sprocket chains being driven by engagement with the sprockets of sprocket wheels 10ª. A device constructed as above described would float upon the water but owing to the weight of the parts referred to would require cylinders 3 of considerable size which cylinders would also be more or less completely submerged in the water. In order that the cylinders may float as nearly as possible upon the surface of the water the following means for lifting a portion of the weight of the device from the water is employed.

Uprights 12 are placed at the front end of the frame 1 and curved slightly rearwardly. These uprights are braced and connected by a cross piece 12ª. At the rear end of the frame shorter uprights 13 are placed and these uprights are formed into upper and lower sections hinged together as shown at 14, and a short distance above the hinges the upper sections are bent inwardly and are carried to a point about the center of the platform 2 and are then bent slightly downwardly forming an inverted bow as shown in Fig. 2. An aerial plane 14 is hinged upon the horizontal portions of the uprights 13 and is guided in its vertical or swinging movement by the uprights 12. To permit adjustment of the aerial plane, I provide brackets 15 which project rearwardly from the cross piece 12ª and which support a rotatable rod 16 which rod has angled end portions and is rotated by handles 17 fixed upon it. The rotation of this rod lifts the angled end portions which are slotted as shown at 18 and rods 19 depend from brackets 21 carried by the sides of the aerial plane, said rods having their lower ends bent to form projecting pins 20 which engage the slots 18 of the angled portions of the shaft 16. The aerial plane is braced by cross wires 22 and is provided with a covering 23 of any suitable light material. A rudder 24 is pivotally mounted in the U-shaped or bow portion of the rear uprights 13. The operation of the device will be obvious from the description given of the construction.

By operating the handles 17 the aerial plane can be lifted upwardly at the forward end so as to set at an angle to the platform 2, this lifting of the aerial plane being permitted by the hinges 14. When lifted as indicated by the dotted lines in Fig. 1 it will act as a guide and the pressure of the air upwardly upon the under surface of the aerial plane will relieve the cylinders 3 of the weight of the motor, platform and other parts.

Having thus fully described my invention, what I claim as new and desire to secure by Letters Patent, is:—

1. A device of the kind described comprising a frame, air-tight cylinders at each end of the frame, a platform carried by the frame, means for driving the cylinders, upwardly and rearwardly curved uprights at the front of the frame, hinged uprights at the rear of the frame, an aerial plane hinged to the rear uprights and guided in its swinging movement by the front uprights, and means for lifting the front of the aerial plane.

2. A combination with a water craft, an aerial plane pivotally mounted at its rear end upon said craft, upwardly and rearwardly curved uprights carried by the front of the craft, brackets carried by the sides of the aerial plane, said brackets sliding upon the uprights, depending rods carried by said brackets, the lower ends of said rods being bent to form pins, and a rotatable angled shaft, the angled portions of said shaft being slotted to receive said pins.

PHILL McDERMOTT.

Witnesses:
HODIE PARNELL,
JAMES R. JONES.